Figure 1:
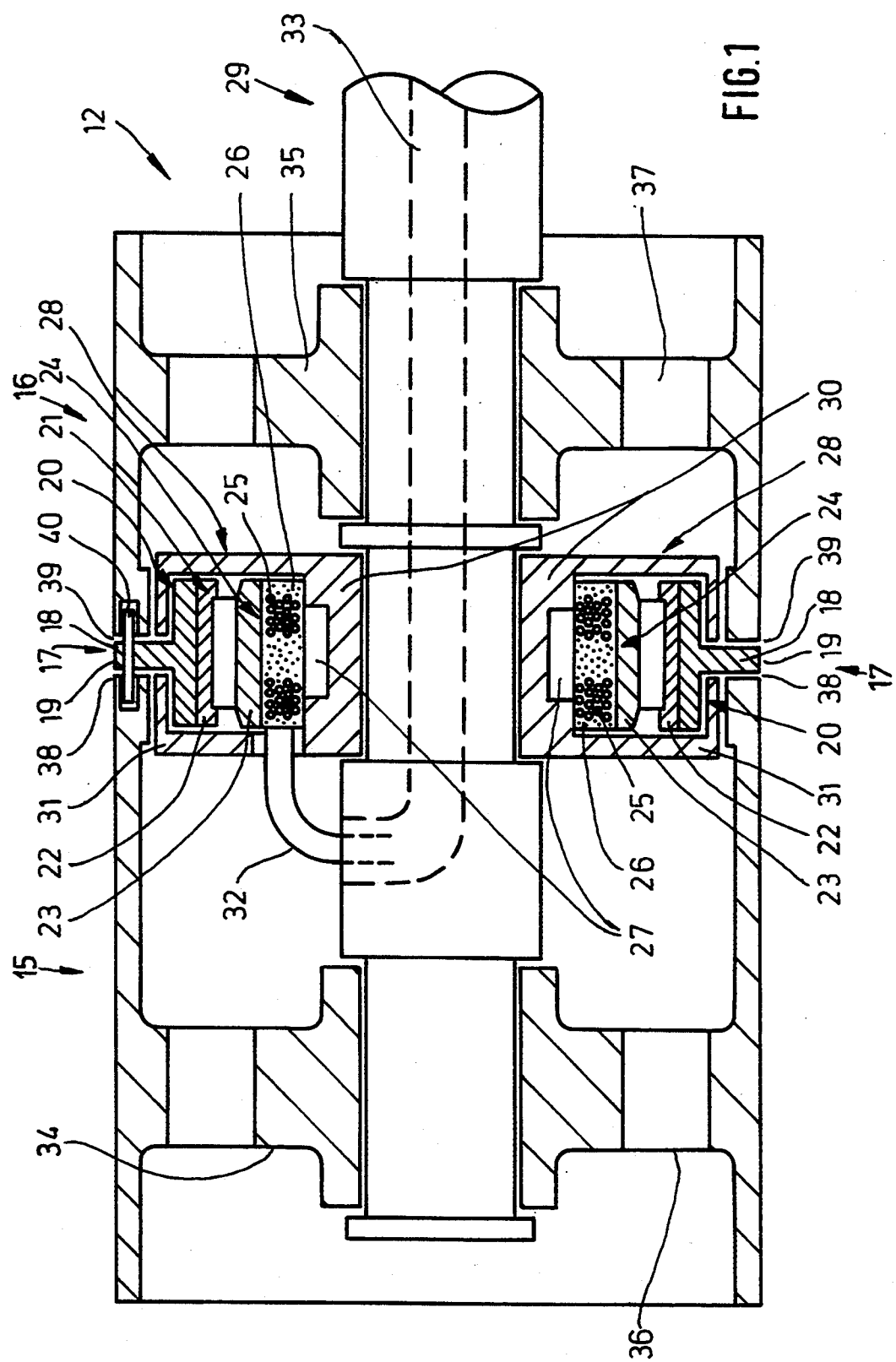

United States Patent

Focke et al.

[11] Patent Number: 5,411,625
[45] Date of Patent: May 2, 1995

[54] APPARATUS FOR BONDING A TEAR TAPE TO A WEB OF MATERIAL

[75] Inventors: Heinz Focke, Verden; Uwe Mehner; Frank J. Hill, both of Delmenhorst, all of Germany

[73] Assignee: Focke & Co. (GmbH & Co.), Verden, Germany

[21] Appl. No.: 60,139

[22] Filed: May 13, 1993

[30] Foreign Application Priority Data

May 14, 1992 [DE] Germany ............... 42 15 690.4

[51] Int. Cl.⁶ .................. B32B 31/04; G05G 15/00
[52] U.S. Cl. ............................. 156/359; 156/555; 156/582; 156/583.4; 492/46
[58] Field of Search ............. 156/359, 555, 580, 582, 156/583.1, 583.4; 100/155 R, 160; 492/46; 425/373; 493/208

[56] References Cited

U.S. PATENT DOCUMENTS

| | | | |
|---|---|---|---|
| 2,552,259 | 5/1951 | Collins et al. | 338/279 |
| 3,218,961 | 11/1965 | Kraft et al. | 100/93 R |
| 3,960,475 | 6/1976 | DeLigt et al. | 425/505 |
| 4,030,960 | 6/1977 | Pratt | 156/555 |
| 4,071,392 | 1/1978 | Chaudhuri | 156/351 |
| 4,105,491 | 8/1978 | Haase et al. | 156/553 |
| 4,288,968 | 9/1981 | Seko et al. | 53/550 |
| 4,380,446 | 4/1983 | Dickson et al. | 493/208 X |
| 4,436,576 | 3/1984 | Seiden | 156/543 |
| 4,820,249 | 4/1989 | Wech | 156/582 X |
| 4,872,301 | 10/1989 | Langen et al. | 53/133 |

FOREIGN PATENT DOCUMENTS

| | | |
|---|---|---|
| 224808 | 6/1987 | European Pat. Off. |
| 1047108 | 12/1958 | Germany |
| 1285856 | 12/1968 | Germany |
| 2701222 | 7/1978 | Germany |
| 3821266 | 1/1989 | Germany |
| 9102387 | 6/1991 | Germany |

*Primary Examiner*—David A. Simmons
*Assistant Examiner*—J. Sells
*Attorney, Agent, or Firm*—Sughrue, Mion, Zinn, Macpeak & Seas

[57] ABSTRACT

An apparatus for bonding a tear tape (10) to a web of material is disclosed. In the packaging art, tear tapes (10) are attached to webs of film in order to create a tear-open aid in packs made of film or with the aid of the film. The tear tape (10) is bonded to the web of material (11) by the application of heat and pressure while the web of material (11) is conveyed with the tear tape (10) over a deflecting roller or sealing roller (12). The sealing roller (12) forms a heating ring (17) which is heated for the transfer of heat and pressure to the web of material (11), but which is thermally insulated from the remaining part of the sealing roller. The sealing roller (12) is formed from several parts. In particular, it is formed from two part rollers (15, 16) and the heating ring (17) which is located between these part rollers with gaps (38, 39).

9 Claims, 3 Drawing Sheets

APPARATUS FOR BONDING A TEAR TAPE TO A WEB OF MATERIAL

DESCRIPTION

The invention relates to an apparatus for bonding a tear tape to a web of material, especially a film web, which is conveyable over the partial periphery of a heated deflecting roller for the transfer of heat and pressure.

Tear tapes are applied to thin packaging material, especially to plastic films, and serve as tear-open aids for packs which are wrapped in such a film. The tear tape may also take the form of a tear string.

Tear tapes or strings can be bonded to the packaging material or the film in different ways. When they are sealed thermally or when thermally activated adhesives are used, heat and pressure have to be transferred to the packaging material and the tear tape in order to bond them together. In a continuous operation, this may be effected by bonding the tear tape to the carrier material in the region of a heated deflecting roller (DE-A-38 21 266).

It is the object of the invention to propose an apparatus with a heated deflecting roller for bonding tear tapes or strings to a web of material, which permits a more precise and more accurately controllable transfer of heat to the region of the sealing and, additionally, requires less heat.

To attain this object, the apparatus is characterized in that an annular portion of the deflecting roller takes the form of a heating ring and is separated from the remaining region of the deflecting roller by insulation, whereby the web of material contacts the deflecting roller in such a way that the tear tape extends in the region of the heating ring.

The apparatus according to the invention permits a defined strip-shaped or linear transfer of the heat to that region of the web of material, in which the (continuous) bond is made to the tear tape which contacts the material. As a result of the separation of the heating ring from the remaining part of the deflecting roller, less heat is required, because only the heating ring is subjected to the required (sealing) temperature. The remaining region of the deflecting roller is not heated.

According to a further feature of the invention, the deflecting roller is comprised of two part rollers, between which the heating ring is disposed. Consequently, the heating ring is a separate means as regards heat generation and heat transfer. An annular or strip-shaped outer heating face contacts the web of material and is preferably flush with the part rollers. The thermal insulation is a result of a sufficient air gap between the ring and the part rollers. Further features of the invention relate to the design of the heating device of the heating ring and to the monitoring of the temperature at the outer periphery and the mounting of the rotatable part of the outer periphery.

A further proposal of the invention permits the control of the transfer of heat and pressure to the web of material. According to the invention, this is attained by changing an angle of wrap with which the web of material contacts the deflecting roller. When a higher temperature is used or when the material is heat-sensitive, the angle of wrap can be smaller than with a material which requires a higher pressure and a longer action of heat. In particular, the sealing time can be kept constant by means of an appropriate adjustment of the angle of wrap if the conveying speed of the web of material varies as a result of other operating conditions.

To change the angle of wrap, the web of material is passed over deflecting means adjacent to the deflecting roller. The position of the deflecting means relative to the deflecting roller can be changed such that the effective angle of wrap is enlarged or reduced.

Figure 2:
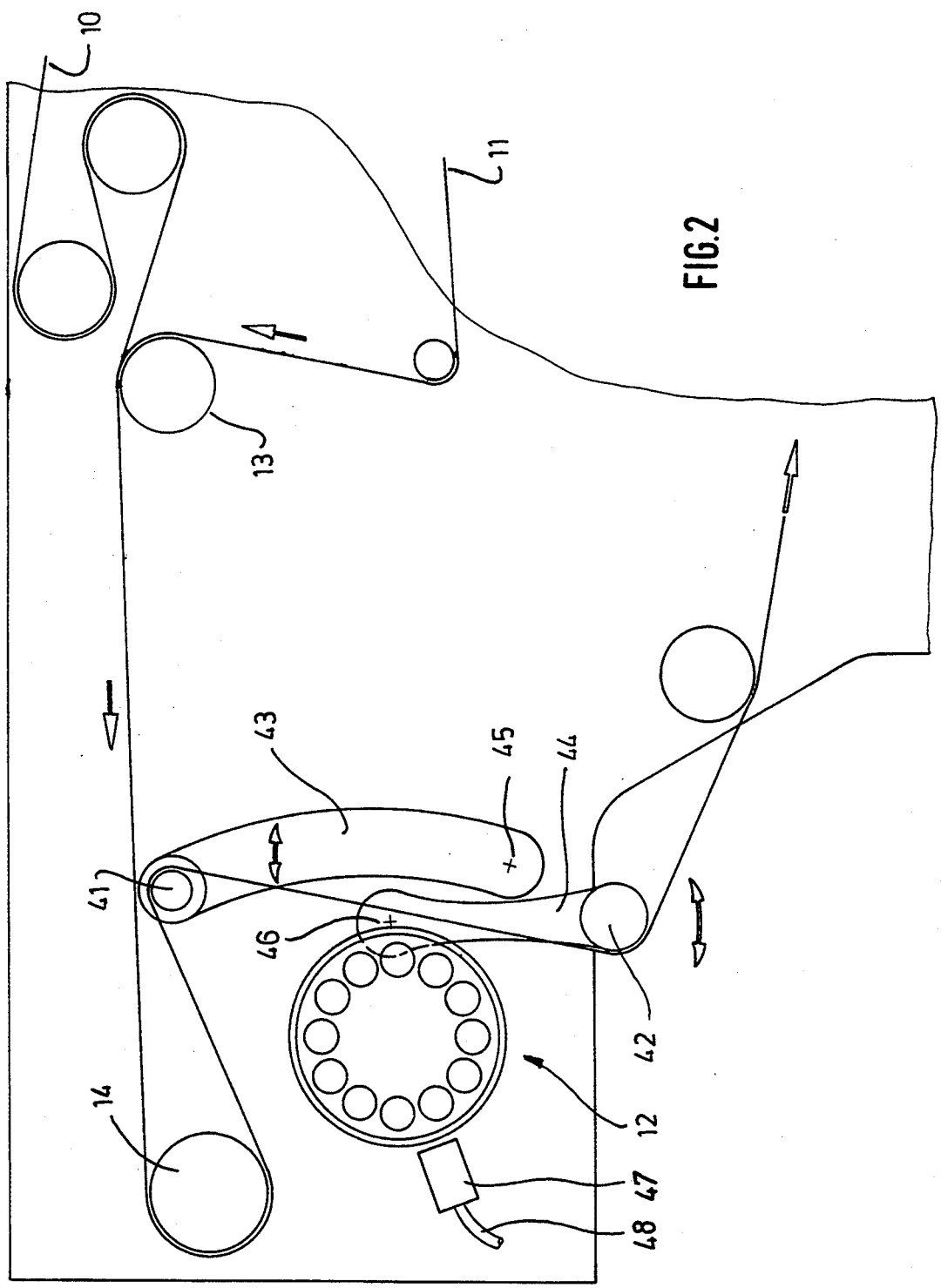
Figure 3:
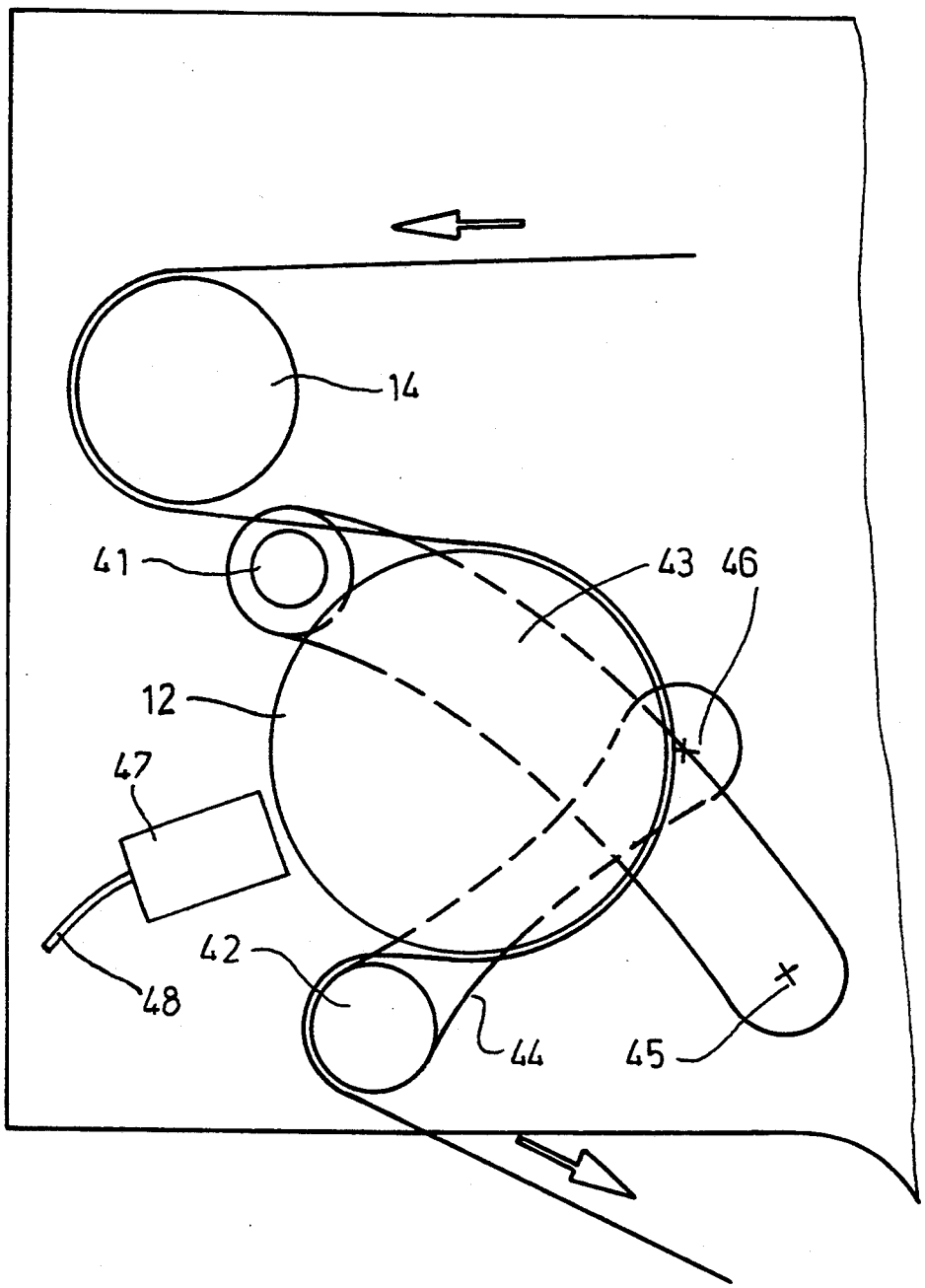

Further features of the invention will be described hereinafter with reference to an exemplary embodiment and the accompanying drawings, in which:

FIG. 1 shows a longitudinal section (axial section) of a deflecting roller with a heating ring, FIG. 2 shows a system for guiding a web of material and a tear tape in the region of the deflecting roller which is shown in side view on a reduced scale, FIG. 3 shows an enlarged detail of the representation of FIG. 2, in which means are located in a different relative position.

The illustrated exemplary embodiment is directed to the bonding of a tear tape 10 to a web of material 11. The latter is for example made of a plastic film and is used for packaging purposes. An outer wrapper of a cigarette pack is, for example, formed from such a material having a tear tape 10.

It is required to apply heat and pressure in order to bond the tear tape 10 to the web of material 11. For this purpose, the web of material 11 is conveyed over a sealing roller 12 together with the tear tape 10 which is placed against the web. Heat and pressure are transferred to the web of material 11 and the tear tape 10 in the region of this sealing roller 12.

In the exemplary embodiment described above, the tear tape 10 and the web of material 11 are each drawn off from separate reels (not shown). The tear tape 10 is guided to the web of material 11 in an accurately positioned manner in a region upstream of the sealing roller 12, specifically during the continuous transport of the web of material. The tape and the web are united in the region of a deflecting roller 13. The unit formed from the web of material 11 and the tear tape 10 is then passed over a further roller 14 and is deflected such that the web of material 11 is guided to the sealing roller 12, that is to say its peripheral surface, together with the tear tape 10 located on the outside. After the tear tape 10 and the web of material 11 have been bonded, the web of material is discharged over further guiding means and is either fed directly to a packaging machine or wound on a reel. The sealing roller 12, which is also a deflecting roller, guides the web of material 11 with the tear tape 10 along a portion of the periphery or peripheral surface. While the web of material 10 contacts the sealing roller 12, heat is transferred to the web of material 11, specifically in the region of the tear tape 10 outwardly resting on the web. Because the web of material 11 contacts the sealing roller 12 under tension, a pressing force is also applied - if required - in order to bond the tear tape 10 to the web of material 11.

In the present case, the required heat is transferred to the web of material 11 locally, in particular in a defined manner in the region of the tear tape 10. Beyond this tape, no heat or at most only very little heat is introduced into the web of material 11.

For this purpose, the sealing roller 12 is designed in a special way. In particular, the sealing roller of the illustrated exemplary embodiment is comprised of two part rollers 15 and 16. Between the part rollers 15, 16 which are disposed equi-axially in an axially spaced relationship, a separate means for the transfer of heat (and pressure) to the web of material 11 is disposed in the region of the tear tape 10. This separate means is a heating ring 17 which extends with an annular web 18 between the two part rollers 15 and 16. A radially outward heating face 19 is in this case flush with the part rollers 15, 16, in particular flush with their outer cylindrical peripheral surface. Alternatively, the heating ring 17 or the web 18 may project slightly beyond the peripheral surface of the part rollers 15, 16 if it is required to produce an increased local pressure.

The web 18 is part of a ring profile 20 of the heating ring 17, which profile has a T-shaped cross-section. This outer ring profile 20 is preferably made of a material which has a high thermal conductivity. The outer part of the heating ring 17, namely the ring profile 20, is mounted rotatably by means of a rolling bearing 21 which, in this case, takes the form of a needle bearing. An outer ring 22 of this bearing is connected to the ring profile 20. An inner ring 23 is mounted fixedly and is heated. The heat is transmitted through the rolling bearing 21 toward the outside to the ring profile 20 and thus into the web 18 and to the heating face 19.

An inner heating device 24 is surrounded by the ring profile 20 or the rolling bearing 21. The inner ring 23 of the rolling bearing forms the radially outward casing of the heating device 24. In the present case, the heating device takes the form of an electric heating. Heating wires 25 are arranged in a coiled configuration and form an electric resistance heating. The heating wires 25 are embedded in an annular body 26 of an originally moldable mass. The material of the body 26 completely surrounds the coiled heating wires 25. The material is thermoconducting. The inner ring 23 surrounds the body 26 on the outside. On the inside, a cavity 27 is formed in order to provide a thermal insulation toward the inside.

The parts of the heating ring 17 described above are (mainly) accommodated in an annular housing 28 which is mounted fixedly on an axle 29 of the sealing roller 12. The housing 28 is made of a thermally insulating material. The body 26 rests (partially) on an annular inner wall 30. An outer wall 31 is provided with a circumferential slot through which the web 18 protrudes.

An electric line 32 leads to the heating device 24, that is to say the heating wires 25. This electric line is passed through a bore 33 in the axle 29 toward the outside.

The two part rollers 15, 16 are each mounted rotatingly on the common axle 29 by means of inner supporting disks 34, 35. The supporting disks 34, 35 are provided circumferentially with bores 36, 37 which carry off heat from the inner space of the part rollers 15, 16. The heating ring 17, that is to say its annular web 18 is insulated against a transfer of heat relative to the adjoining peripheral surfaces of the part rollers 15, 16 by means of circumferential gaps 38, 39. To ensure a uniform and especially continuous rotating movement of the means, the rotatable part of the heating ring 17, i.e. the web 18, is connected to the part rollers 15, 16. For this purpose, a few transversely directed pins 40 which act as connecting means are disposed along the periphery between the part rollers 15, 16 and the heating ring 17.

To control the sealing temperature, the actual temperature is constantly measured directly at the heating face 19 of the heating ring 17. Consequently, the temperature losses in the inner space do not have to be taken into account. To monitor the temperature of the heating face 19, an infrared sensor 47 is disposed at a small distance from the peripheral surface of the sealing roller 12. The infrared sensor 47 is connected to a control unit (not shown) for the heating device 24 via an instrument line 48. When the infrared sensor 47 detects a variation of the temperature of the heating face 19, a control signal is generated so that the heating power of the heating device 24 can be adjusted accordingly.

A further outstanding feature of the apparatus, which is related to the sealing roller 12 described above, but which can also be used independently thereof, is evident from FIGS. 2 and 3. Accordingly, measures are provided which permit a variation of the wrap region of the deflecting roller for the web of material 11. For this purpose, the sealing roller 12 is in this case associated with movable deflecting means for the web of material 11. These deflecting means a relocated in such a position relative to one another that the web of material 11 can be lifted off completely from the periphery or peripheral surface of the deflecting roller (sealing roller 12) (FIG. 2), or that it can surround the peripheral surface with a selectable wrap region. FIG. 3 shows a position in which a large area of the sealing roller 12 is wrapped, namely approximately half of the periphery of this roller.

The deflecting means are movable deflecting rolls 41 and 42. One of these deflecting rolls 41 is located in a region above the sealing roller 12 and the other deflecting roll 42 is located in a region below the sealing roller 12. When the deflecting rolls 41, 42 are located in a position far away from the sealing roller 12 or its peripheral surface (FIG. 2), the web of material 11 is guided past the sealing roller 12 or contacts it only with a very small angle of wrap. If, on the other hand, the deflecting rolls 41, 42 are moved closer to the sealing roller 12 or even moved in a position beyond the sealing roller 12 (with respect to the initial position shown in FIG. 2), the wrap region of the sealing roller 12 increases (FIG. 3). Here, the upper deflecting roll 41 is moved to such an extent that it is lifted off the web of material 11. The lower deflecting roll 42 forms the required counter deflection for the stationary deflecting roller 14.

As is evident, the variation of the wrap can also be effected by just one movable deflecting roll 42 in conjunction with an appropriately positioned stationary deflecting roller 14.

The two deflecting rolls 41, 42 are each disposed on a pivotable guide rod 43 and 44, respectively. The relative position is in this case such that the guide rod 43 for the upper deflecting roll 41 is mounted pivotably below the sealing roller 12 with a pivot bearing 45. The guide rod 44 is pivotable about a pivot bearing 46 which is located above the other pivot bearing 45. To adjust the required wrap region, the guide rods 43, 44 are movable in an appropriate manner, for example via shafts in the region of the pivot bearing 45, 46 or by means of pressure medium cylinders.

As a result of the variation of the wrap region of the sealing roller 12, it is possible to adjust the heating time - with a given conveying speed - and also the contact pressure.

This is particularly important in the case of variations of the conveying speed of the web of material 11 caused by other operating conditions. In order to ensure continuously constant temperature and/or pressure conditions, adjustments are made in this case by means of a variation of the wrap region of the sealing roller 12. As a result, the adjustment is faster compared to adjustments made by means of a change of the heating temperature.

The apparatus is particularly advantageous for the sealing of tear tapes or tear strings by means of hotmelt. The tear tape 10 can be pre-sealed to the web of material 11 in a first operating step, so that there is a first bonding between the tear tape 10 and the web of material 11. Then, the bonding is completed by means of the sealing roller 12 according to the invention with the transmission of heat and pressure. Besides, the tear tape 10 is positioned accurately because the web of material 11 contacts the cylindrical peripheral surface of the sealing roller 12 together with the tear tape 10.

We claim:

1. An apparatus for bonding a tear tape (10) to a web (11) of material, the tear tape being disposed in spaced relationship to both edges of the web (11) of material, and, wherein for transferring heat and pressure, the tear tape (10) and the web (11) of material are conveyable over a portion of a periphery of a heated sealing roller (12), said apparatus comprising:
    a) means for bringing together the tear tape (10) and the web (11) of material in a region of the sealing roller (12) and supplying them to the periphery of the sealing roller (12) as a unit,
    b) wherein the sealing roller (12) includes two part rollers (15, 16), between which a heating ring (17) is disposed,
    c) wherein the heating ring (17) is insulated from the part rollers (15, 16) by a gap (38, 39) extending on both sides of the heating ring (17),
    d) wherein the part rollers (15, 16) and the heating ring (17) are mounted on a common, fixedly disposed axis (29),
    e) wherein the heating ring has a radially outer heating face (19) which extends flush with lateral areas of the part rollers (15, 16), or slightly projects therefrom, and
    f) wherein a unit of the tear tape (10) and the web of material (11) abuts the sealing rollers such that the tear tape (10) extends in a region of the heating ring (17).

2. The apparatus as claimed in claim 1, wherein the heating ring (17) is disposed within projecting regions of the part rollers (15, 16), and projects therefrom with a radially directed web (18), the web (18) being provided with the heating face (19) which is located on its radially outer side.

3. The apparatus according to claim 2, wherein, in an outward region, the heating ring (17) has a heated ring profile (20) with the radially directed web (18), and an inner, annular electric heating device (24), the heating device (24) being fixedly disposed, and the ring profile being mounted thermoconductingly and rotatably on the heating device (24).

4. The apparatus according to claim 3, wherein the heating ring (17) is disposed in a housing made from heat insulating material which is fixedly disposed within the sealing roller (12), and projects therefrom only with a radially directed web (18).

5. The apparatus according to claim 3, wherein the heating device (24) is formed from wound heating wires (25) which are embedded in an annular body (26).

6. The apparatus according to claim 3, wherein an electric line (32) leads to the heating device (24), which leads toward the outside via a bore (33) in an axle (29).

7. The apparatus according to claim 2, wherein the heating ring (17), or the radially directed web (18) of the same, is connected to the part rollers (15, 16) by a plurality of axis-parallel pins (40) which are distributed along a periphery.

8. The apparatus according to claim 1, comprising means for continuously measuring the temperature of the heating ring (17) directly at the heating face (19), whereby, in the event of temperature deviations, a corresponding control signal is generated for the adjustment of the sealing temperature.

9. An apparatus for transporting a web of material (11), for bonding a tear strip (10) to the web of material (11), that is guided over at least one deflecting or sealing roller (12), said apparatus further comprising means for guiding a unit of the web of material (11) and the tear strip (10), in the region of the deflecting or sealing roller (12), over deflecting members (41, 42), which are movable, so that, because of relative positions of the deflecting members (41, 42) relative to the deflecting or sealing roller (12), which is not movable, a region of abutment of the unit of the web of material (11) and the tear tape (10) on the periphery of the deflecting or sealing roller (12) varies the heat or pressure transferred to the unit of the web of material and the tear tape (10); wherein an upper one of the deflecting members (41) is located in a region above, and the other, lower deflecting member (42) is located in a region below the deflecting or sealing roller (12); wherein the deflecting members (41, 42) are arranged on respective upper and lower pivotable guide rods (43, 44) the upper guide rod (43) for the upper deflecting member (41) being pivotably mounted on a pivot bearing (45) which is arranged outside of the region of the deflecting or sealing roller (12) and below the same, and the other, lower guide rod (44) for the lower deflecting member (42) being pivotably mounted on a pivot bearing (46) which also is arranged outside of the region of the deflecting or sealing roller (12) and above the pivot bearing (45) for the upper guide rod (43).

* * * * *